3,032,517
PREPARATION OF RIGID POLYESTERURETHANE FOAM
Bernard A. Dombrow, Teaneck, and John H. Nichols, East Orange, N.J., assignors to Nopco Chemical Company, Harrison, N.J., a corporation of New Jersey
No Drawing. Filed Aug. 1, 1956, Ser. No. 601,371
4 Claims. (Cl. 260—2.5)

This invention relates to foamed plastic materials. More particularly, it relates to foamed plastic products having greatly improved physical properties and characteristics and to the process by which those products are produced.

The foamed plastic products with which the present invention is concerned are compositions produced by the reaction of a polyester type material with a compound having more than one isocyanate group, that is, a polyisocyanate compound. These products are characterized, in part, by their unique cellular structure. Some years ago, it was discovered that when a compound having a plurality of isocyanate groups was reacted with a polyester type composition in the presence of water, carbon dioxide gas was evolved and entrapped within the reactant mass, expanding same and providing it with a distinctive porous or cellular structure. The phenomenon by which the reacting mass entraps the evolved carbon dioxide gas and expands it is referred to in the art, and will be referred to herein, as foaming.

The properties and characteristics of foamed plastic products are determined to a very large extent by the nature of the ingredients, and the proportions thereof, which are used in their production. Thus, for example, depending upon the nature and the proportions of the materials used in their production, a polyester-polyisocyanate reaction product sets to a cellular mass which is either rigid or flexible. By altering the nature of the constituents used in their production, and/or the proportions thereof, certain properties of the foamed plastic products, such as, thermal resistance, water resistance, oil resistance, density, etc., can be modified or adjusted to render the products suitable for a contemplated or proposed use.

In recent years, great advances have been made toward providing the market with satisfactory foamed plastic products. However, despite such advances, vast improvements, both in the products and in the processes by which they are prepared, are necessary. A particularly pressing problem is the need for providing a method for obtaining foamed plastic products having uniform cellular structure. Many of the products of the art are comprised of cells which are irregular both in size and in shape. This characteristic tends greatly to reduce the marketability of those products. Thus, in the first place, a product composed of cells which are uniform both in size and in shape has far greater commercial appeal than a product composed of cells which are irregular in size and in shape. However, and of far greater importance is the fact that the cell structure of a particular foamed plastic product and the utility of that product are closely associated. Quite obviously, the ability of any foamed plastic product to function uniformly under the various conditions that it may encounter in its use will depend upon whether or not the cells which comprise that structure are alike in size and in shape. Lacking uniformity in its cell structure, the product will be unable to withstand uniformly, particularly stresses and strains to which it may be subjected.

The object of this invention is to provide foamed plastic products having greatly improved cellular structure. More particularly, the object of this invention is to provide foamed plastic products which are composed of a large number of extremely small cells which are substantially uniform both in size and in shape.

A further object of the invention is to provide a method for producing such products.

Other objects of the invention will be obvious and will, in part, appear hereinafter.

It has been discovered that the above and other objects of the invention are accomplished when a polyester is reacted, at atmospheric pressure with or without the application of external heat, with a compound containing more than one isocyanate group in the presence of a mixture comprising (1) a water-soluble salt of a phosphoric acid ester and (2) a condensate produced by reacting an alkylene oxide with a hydrocarbon-substituted phenol-formaldehyde reaction product.

In general, the present invention is applicable to the production of foamed plastics, both rigid and flexible, using any of the various polyesters which are recognized in the art as being suitable for use in producing such products. In its broadest embodiment, the invention is practiced using a polyester having an acid number of from about 5 to about 80. As used throughout the specification and in the claims, the expression "polyester" includes any product produced by the reaction of a polyhydric alcohol or mixtures thereof and a polybasic acid or mixtures thereof. The polyesters that are used in carrying out the present invention are prepared from a polyhydric alcohol-polybasic acid mixture in which the ratio of hydroxyl groups to carboxyl groups is within the range of from about 3 hydroxyls: 1 carboxyl to 4 hydroxyls; 5 carboxyls. Thus, for example, polyesters which are well suited for use can be produced by reacting polybasic acids or mixtures thereof, such as, adipic acid, sebacic acid, isosebacic acid, citric acid, lactic acid, etc. or other similar ester-forming compounds, such as, phthalic anhydride, maleic anhydride, etc. with appropriate quantities of polyhydric alcohols, such as, diethylene glycol, triethylene glycol, 1,4 butylene glycol, glycerol, trimethylol propane, etc. as well as mixtures thereof. Moreover, in addition to such polyesters, the improved plastic products of the invention can be produced using any of the so-called modified polyesters of the art. Modified polyesters are produced by adding agents, such as, oleic acid, castor oil, linseed oil, etc., or resin copal, rosin, etc. to the polybasic acid-polyhydric alcohol formulation prior to converting same, by appropriate means, into the desired polyester.

The method employed in producing the polyesters that are used in preparing our novel foamed plastic products is not a part of, and, hence, does not limit the scope of, the invention. In general, polyester compositions fully suited for use can be prepared by any of the well known procedures of the art. As indicated heretofore, the only restriction on the production of the polyesters employed is that they be prepared from such quantities of polybasic acids and polyhydric alcohols as will provide a ratio of hydroxyl groups to carboxyl groups in the reaction mixture which is within the range of from about 3 hydroxyls:1 carboxyl to 4 hydroxyls:5 carboxyls. Moreover, while in its broadest embodiment, the invention contemplates the use of a polyester having an acid number within the range of from about 5 to about 80, the use of a polyester having an acid number of from about 5 to about 25 has been found to bring about particularly outstanding results. Furthermore, in the preferred practice of the invention, the polyester used will have a water content of from about 0.1% to about 5.0% by weight. The following examples are formulations employed in producing a few of the polyesters that can be used in carrying out the invention. It should be understood, however, that in setting forth these specific formulations, we do not intend to restrict the invention to the use thereof.

FORMULA A

| | | |
|---|---|---|
| Glycerol | mols | 4 |
| Adipic acid | do | 3 |

FORMULA B

| | | |
|---|---|---|
| Trimethylol propane | mols | 3 |
| Phthalic anhydride | do | 2 |

FORMULA C

| | | |
|---|---|---|
| Glycerol | mols | 1 |
| Phthalic anhydride | do | 1.5 |
| Oleic acid | do | 0.5 |

FORMULA D

| | | |
|---|---|---|
| Glycerol | gram mols | 1 |
| Sebacic acid | do | 1.5 |
| Resin copal | grams | 100 |

FORMULA E

| | | |
|---|---|---|
| Ethylene glycol | mols | 5.2 |
| Maleic anhydride | do | 4 |
| Adipic acid | do | 1 |

FORMULA F

| | | |
|---|---|---|
| Glycerol | mols | 2 |
| Pentaerithritol | do | 0.5 |
| Phthalic anhydride | do | 1 |
| Isosebacic acid | do | 3 |

When suitably adjusted to an acid number within the range of from about 5 to about 80 and, preferably, when adjusted to a water content of from about 0.1% to about 5.0% by weight, any of the above polyesters can be used in producing the products of this invention with equally outstanding results.

In the practice of the invention, the polyester is reacted with a composition containing more than one isocyanate group. Included within this category are blends containing a polyisocyanate and one or more high molecular weight thermoplastic film-forming additives and polyisocyanate addition products. In an alternate embodiment of the invention, the polyisocyanate reactant can be replaced, either in whole or in part, by a polyisocyanate compound. Products having excellent properties and characteristics can be produced by reacting the polyester with an addition product of meta-toluene diisocyanate. In addition, one may use mixtures of isomers of toluene diisocyanate.

However, as will be readily apparent to those skilled in the art, other polyfunctional isocyanates, such as, diphenylmethane diisocyanate can be employed instead.

The polyisocyanate addition products that can be used in the practice of the invention are compositions such as are disclosed in U.S. Patent 2,602,783. These are products produced by reacting a polyisocyanate with a compound, or with a mixture of compounds, having more than one functional group or radical, each of which groups or radicals contains at least one labile hydrogen atom capable of reacting with the polyisocyanate compound by addition polymerization. Examples of compounds containing such reactive groups and radicals are: (1) polyfunctional aliphatic alcohols, such as, 2-methyl-2,4-pentanediol; 1,4-hexanediol; 1,5-pentanediol; ethylene glycol; diethylene glycol; etc., (2) polyfunctional phenols, such as, resorcinol; pyrocatechol; pyrogallol; etc., (3) bifunctional metal soaps, such as, aluminum monostearate, aluminum monooleate, aluminum monopalmitate, bismuth monostearate, etc. Furthermore, addition products of the type produced by reacting a polyisocyanate compound with a polyfunctional amino alcohol, a polyfunctional aliphatic or aromatic amine or a polyfunctional thioglycol can be used.

The outstanding advantage of the present invention is that it provides a means for producing foamed plastic products having uniform cellular structure. This highly desirable result is accomplished readily by incorporating a mixture of (1) a water-soluble salt of an alkyl polyphosphoric acid ester and (2) a composition produced by condensing an alkylene oxide with a hydrocarbon-substituted phenol-formaldehyde reaction product into the foamed plastic-forming reaction mixture. As will be pointed out hereinafter, in certain instances, one need only use one or the other of these additives. However, the combination can be used in all embodiments of the invention. As a class, the alkyl polyphosphoric acid ester salts employed in the process are best identified and described by reference to a particularly well known and commercially available member of this class. This product is known in and sold to the trade under the trade name of Victawet 35–B. It is a product of Victor Chemical Company, Chicago, Illinois. This composition is comprised of the 2-ethylhexyl ester of pentasodium tripolyphosphate and about 30% by weight of water. Said ester has the formula $Na_5R_5(P_3O_{10})_2$ in which R is 2-ethylhexyl. While this product is employed in the preferred embodiment of the invention, it should be understood that the invention is not restricted solely to its use. Thus, any similar or comparable water-soluble product as, for example, the potassium or amine salt thereof can be employed, if desired. Moreover, water-soluble compounds in which the ester group is a radical other than the 2-ethylhexyl radical can be employed. In addition, esters of sodium hexametaphosphate and tetra sodium pyrophosphate and of salts of the intermediate polyphosphoric acids or mixtures thereof can be employed.

The condensation products which are employed in the practice of the invention are products produced by condensing a phenol-formaldehyde reaction product with an alkylene oxide in such quantities that up to about 20 mols of alkylene oxide are provided for each phenolic hydroxyl radical in the phenol-formaldehyde reaction product. The phenol-formaldehyde reaction product is prepared by condensing formaldehyde with at least a molecular equivalent of a suitable hydrocarbon-substituted phenol. However, phenol-formaldehyde reaction products, produced by condensing formaldehyde with a substantial excess of the hydrocarbon-substituted phenol and which are subsequently condensed with ethylene oxide can be used. As used herein, the expression "hydrocarbon-substituted phenol" includes substituted phenols, the hydrocarbon substituent or substituents of which are straight or branched chain acyclic groups, such as, n-butyl, isobutyl, dibutyl, tertiary butyl, amyl, tertiary amyl, n-octyl, decyl, dodecyl groups, etc., or alicyclic groups, such as, cyclohexyl, methylcyclohexyl, dicyclohexyl groups, etc. In addition, one may use an alkylene oxide-phenol-formaldehyde condensate derived from aryl substituted phenols, such as, p-phenyl phenol, p-naphthyl phenol, etc., if desired.

As indicated heretofore, the hydrocarbon substituted phenol-formaldehyde reaction product is, for the purposes of this invention, condensed with up to about 20 mols, for each phenolic hydroxyl group present in said reaction product, of an alkylene oxide and used in combination with the alkyl polyphosphoric acid ester salt. It has been found that excellent results are obtained when the alkylene oxide-phenol-formaldehyde condensate used is a product prepared by the reaction of the substituted phenol-formaldehyde reaction product with ethylene oxide in a ratio of up to about 7.5 mols of ethylene oxide for each phenolic hydroxyl radical present in said reaction product. Although, in its broadest embodiment, the invention contemplates the use of compositions prepared by the reaction of substituted phenol-formaldehyde products with alkylene oxides other than ethylene oxide, as, for example, propylene oxide and butylene oxide, the use of compositions prepared by reacting the phenol-formaldehyde reaction product with ethylene oxide is especially preferred.

There is, moreover, a further but more limited embodiment of our invention. Thus, it has been stated heretofore that by proceeding as disclosed herein one can obtain both rigid and flexible foamed plastic materials. For the most part, the nature of the polyester used in producing these materials will determine whether or not it will be rigid or flexible in nature. In general, the use of a polyester of the type referred to in the art as an alkyd resin will result in the production of a foamed plastic product which is rigid in nature. These polyesters, produced, for example, by reacting a triol, such as, trimethylolpropane with adipic acid are characterized, in general, by their branched chain structure. Flexible foamed plastic products are, on the other hand, produced from polyesters which are essentially linear in nature. Polyesters of this type are produced, for example, by reacting diethylene glycol with adipic acid. Thus, although the combination of (1) the ethylene oxide-phenol-formaldehyde condensation product and (2) the water-soluble alkyl polyphosphoric acid ester salt can be used when producing a rigid foamed plastic product, one may use, in lieu of the combination, either the ethylene oxide condensate or the polyphosphoric acid ester salt in admixture with other emulsifiers and obtain equally outstanding results. In like manner, one may use the aforesaid combination or the ethylene oxide condensate or the polyphosphoric acid ester salt, the latter either alone or in combination with other emulsifiers, in producing flexible products. A sulfonated oil, such as sulfonated castor is particularly well suited for use in combination with the alkyl polyphosphoric acid ester salt.

Neither the production of the phenol-formaldehyde reaction products nor the production of the alkylene oxide condensates therefrom is a part of the present invention. Such products and the techniques and procedure used in their preparation are well known in the art. In general, products completely suitable for use can be prepared by any of the methods known in the art.

The manner in which the phenol-formaldehyde-ethylene oxide condensation products and the alkyl polyphosphoric acid ester salts are used in carrying out the invention will be readily apparent to those skilled in the art. The use of these additive materials does not necessitate any change in the procedures which are now used in the commercial production of foamed plastics. Thus, for example, in the conventional production methods of the art, the foam-forming reactants, that is, the polyester and the polyisocyanate compound, are initially commingled in a suitable vessel until homogeneous. This is accomplished at atmospheric pressure and generally at about room temperature. If desired, or if necessary, the reactants can be mixed at a temperature which is elevated somewhat above room temperature. Before producing the products of the present invention, one need only add the alkyl polyphosphoric acid ester salt and the alkylene oxide-phenol-formaldehyde condensation product to the reactants prior to mixing and pouring same in place. The manner in which these additives are incorporated into the reaction system is not at all critical to the operability of the invention. Thus, for example, the additives or a mixture thereof can be added to the polyester prior to mixing the polyisocyanate compound therewith. Furthermore, if desired, the additives or a mixture thereof can be added to the polyester-polyisocyanate reaction mixture itself or blended simultaneously with the polyester and polyisocyanate reactants. In the preferred embodiment of the invention, however, the additives, or the mixture thereof, are incorporated into the polyester prior to mixing same with the polyisocyanate.

It has been found that only a relatively small quantity of additive is required to achieve the desired results. On a dry basis, as little as about 0.1% by weight of additive, that is, the mixture of emulsifiers or, where approprate, the individual emulsifiers, based on the weight of the polyester will produce a marked improvement in the uniformity of the cell structure of the product. Much larger quantities can be used, if desired, as, for example, 15.0% by weight or greater, on a dry basis, based on the weight of the polyester. However, generally no particular advantage will be gained by the use of more than about 12.0% by weight of additive. This is especially true in the production of flexible foamed products where seldom, if ever, will it be necessary to employ more than about 5.0% by weight or greater of additive. Furthermore, while in the preferred embodiment for the production of rigid foamed plastics, the additive comprises, on a dry basis, about equal parts by weight of alkyl polyphosphoric acid ester salt and alkylene oxide-phenol-formaldehyde condensate, a mixture of those materials comprising from about 80% to about 20% by weight of alkyl polyphosphoric acid ester salt with from about 20% to about 80% by weight of the alkylene oxide-phenol-formaldehyde condensate can be used.

The ratio of polyisocyanate to polyester present in the reaction system used in producing the improved products of the invention can vary within rather wide limits. Ordinarily the quantity of polyisocyanate used will be equivalent to from about 75% to about 120% by weight of the amount theoretically required to react with the reactive hydrogen atoms in the reaction mixture. Preferably, the quantity of polyisocyanate used will be equivalent to from about 90% to about 105% by weight of the amount theoretically required to react with the reactive hydrogen atoms in the reaction system.

Furthermore, in carrying out the present invention, other ingredients, the utility of which in such systems has been disclosed in the art, can be incorporated into the reaction mixture. Thus, for example, in the practice of the invention, ethyl cellulose can be used as an additive. Products having completely satisfactory properties are obtained when from about 0.03 part to about 15 parts by weight of a commercial grade of an ethyl cellulose resin are incorporated into the reaction mixture. The ethyl cellulose resins employed are those having an ethoxyl content of from about 43% to about 50% and a viscosity of from about 7 to about 200 centipoises as determined on a 5% by weight solution in a 60:40 toluene-ethanol solvent at 25° C. The process by which the products of the invention are prepared can be carried out in the absence of a catalyst. Furthermore, the invention can be practiced in the presence of foam stabilizers, such as, high molecular weight, thermoplastic, film-forming polymeric resins as disclosed in U.S. Patent 2,591,844 or quaternary ammonium bentonite complexes. In addition, flame-resistant and fire-retardant materials of the type described in U.S. Patent 2,602,783 can be used in the production of the invention. Furthermore, non-ionic wetting agents, metallic hydrate salts, metallic soaps, metallic leafing powders and mixtures thereof, of the type disclosed in the art as being useful in polyisocyanate-polyester reaction systems, can be used in carrying out the invention.

Products produced by the process of this invention are superior to many of the products disclosed in the art. An examination of a cross-section of the foamed plastic products prepared as disclosed herein reveals that those products are comprised of a large number of small cells, which are substantially uniform and regular both in size and in shape. Such results are noteworthy and wholly and entirely unexpected. Thus, while certain classes of emulsifiers have been used heretofore in producing foamed plastic products, it apparently was not known that, by the use of such materials, foamed plastic products of improved cellular structure could be or were, in fact, obtained. This confirms our finding that, with the exception of the emulsifying agents disclosed herein, such agents do not, as a general rule, improve the cell structure of the foamed plastic products.

For a fuller understanding of the nature and objects of this invention, reference may be had to the following examples which are given merely as further illustrations of the invention and are not to be construed in a limiting sense. All parts given are parts by weight.

*Example I*

In this example, 8.2 parts of the ethyl hexyl ester of pentasodium tripolyphosphate and 5.7 parts of an ethylene oxide condensate of t-octylphenylolmethane were added to 86.1 parts of a polyester. The polyester was produced using the following named ingredients in the proportions indicated:

| | Parts |
|---|---|
| Trimethylol propane | 61.39 |
| Adipic acid | 41.81 |
| Phthalic anhydride | 8.48 |

This resin was prepared by heating the ingredients in an inert atmosphere under pressure. The resin was adjusted so that it had an acid number of about 8.0 and a water content of about 1.4% by weight. The ethylene oxide condensate of t-octylphenylolmethane was produced by condensing ethylene oxide with the product produced by reacting t-octylphenol with trioxane in such quantities that there were 6.0 moles of ethylene oxide present for each phenolic hydroxyl group in the t-octylphenylolmethane. The t-octylphenylolmethane were produced by reacting t-octylphenol and trioxane in quantities such that the mol ratio of phenol to formaldehyde was approximately 1 to 0.5.

Subsequently, the polyester resin and its additives (53 parts) were mixed with meta-toluene diisocyanate containing 4% ethylcellulose (47 parts). The reaction mass was stirred thoroughly. A fluid mixture was thus obtained. Before foaming commenced the reaction mixture was poured in placed. The reaction, with its characteristic foaming, was allowed to proceed to completion without the application of external heat. When the reaction was complete, the foamed plastic mass was post-cured at a temperature of about 200° F. for a period of about 2 hours.

The foamed plastic product of this example was a rigid structure composed of an extremely large number of small cells. An examination of a cross-section of this product revealed that it was composed of cells which were substantially uniform and regular both in size and in shape.

Example II

To 86.1 parts by weight of the polyester resin used in Example I, 8.2 parts by weight of the ethyl hexyl ester of pentasodium tripolyphosphate and 5.7 parts by weight of Tween 20, a polyoxyethylene sorbitan monolaurate, a product of Atlas Powder Company, Wilmington, Delaware, were added. Thereafter, 53 parts by weight of the mixture thus produced was mixed with 47 parts by weight of meta toluene diisocyanate containing 4% of ethyl cellulose. Before foaming commenced the reaction mixture was poured in place. When the reaction was complete, a cross section of the product was examined and found to be composed of a very large number of very small cells which were substantially uniform both in size and in shape.

Example III

To 86.1 parts by weight of the polyester resin used in Example I, 8.2 parts by weight of the ethyl hexyl ester of pentasodium tripolyphosphate and 5.7 parts by weight of Nacconol NR, a salt-free alkyl aryl sodium sulfonate produced by the National Aniline Division, Allied Chemical and Dye Corporation, New York, New York, were added.

Thereafter, 53 parts by weight of the mixture thus produced was mixed with 47 parts by weight of meta toluene diisocyanate containing 4% ethyl cellulose. Before foaming commenced, the reaction mixture was poured in place. When the reaction was complete, a cross-section of the product was examined and found to be composed of a very large number of very small cells which were substantially uniform both in size and in shape.

Having described our invention, what we claim is new and desire to secure by Letters Patent is:

1. In a process for producing rigid foamed plastic materials by reacting in the absence of a catalyst (a) blends containing an organic polyisocyanate compound containing more than one isocyanate group and ethyl cellulose, (b) a substantially cross-linked polyester having an acid number of from about 5 to about 80, and (d) water, said (b) the polyester, being the reaction product of a mixture comprising a polyhydric alcohol and a polycarboxylic acid in which mixture the hydroxyl groups and carboxyl groups are in a ratio of from $$3(OH):1(COOH)$$

to 4(OH):5(COOH), the step which comprises mixing with said (a), (b) and (d), (c) a water-soluble emulsifier consisting of a mixture of from about 80% to about 20% by weight of a composition produced by condensing a hydrocarbon substituted phenol-formaldehyde reaction product with up to about 20 mols for each phenolic hydroxyl group present in said reaction product, of a lower alkylene oxide, said phenol formaldehyde reaction product being obtained by condensing formaldehyde with at least one molecular equivalent of a hydrocarbon substituted phenol and from about 80% to about 20% by weight of a water-soluble salt of a tripolyphosphate ester having the formula $Na_5R_5(P_3O_{10})_2$ in which said R is an alkyl substituent having eight carbon atoms, said (a) being present in a quantity equivalent to from about 75% to about 120% of the amount theoretically required to react with the reactive hydrogen atoms in the reaction system, said (c) the emulsifier being present in a quantity equivalent to at least about 0.1% by weight of (b) and said (d), water being present in a quantity equivalent to from about 0.1% to about 5.0% by weight of (b).

2. The process of claim 1 wherein the emulsifier, (c) is present in an amount of from about 0.1% to 15.0% by weight of said polyester, (b).

3. The process of claim 2 wherein the polyisocyanate is toluene diisocyanate.

4. The process of claim 2 wherein said blend containing an organic polyisocyanate compound containing more than one isocyanate group and ethyl cellulose, (a), is meta toluene diisocyanate containing about 4% by weight of ethylcellulose.

References Cited in the file of this patent

UNITED STATES PATENTS

| 2,542,001 | De Groote et al. | Feb. 20, 1951 |
| 2,577,279 | Simon et al. | Dec. 4, 1951 |
| 2,591,884 | Simon et al. | Apr. 8, 1952 |
| 2,602,783 | Simon et al. | July 8, 1952 |
| 2,764,565 | Hoppe et al. | Sept. 25, 1956 |
| 2,779,689 | Reis | Jan. 29, 1957 |
| 2,894,919 | Simon et al. | July 14, 1959 |

FOREIGN PATENTS

| 729,523 | Great Britain | May 4, 1955 |

UNITED STATES PATENT OFFICE
CERTIFICATE OF CORRECTION

Patent No. 3,032,517 May 1, 1962

Bernard A. Dombrow et al.

It is hereby certified that error appears in the above numbered patent requiring correction and that the said Letters Patent should read as corrected below.

Column 3, line 42, for "polyisocyanate" read -- polyisothiocyanate --; column 6, line 47, after "production" insert -- of the products --; column 7, line 28, for "placed" read -- place --.

Signed and sealed this 30th day of October 1962.

(SEAL)
Attest:

ERNEST W. SWIDER
Attesting Officer

DAVID L. LADD
Commissioner of Patents